Patented Nov. 22, 1927.

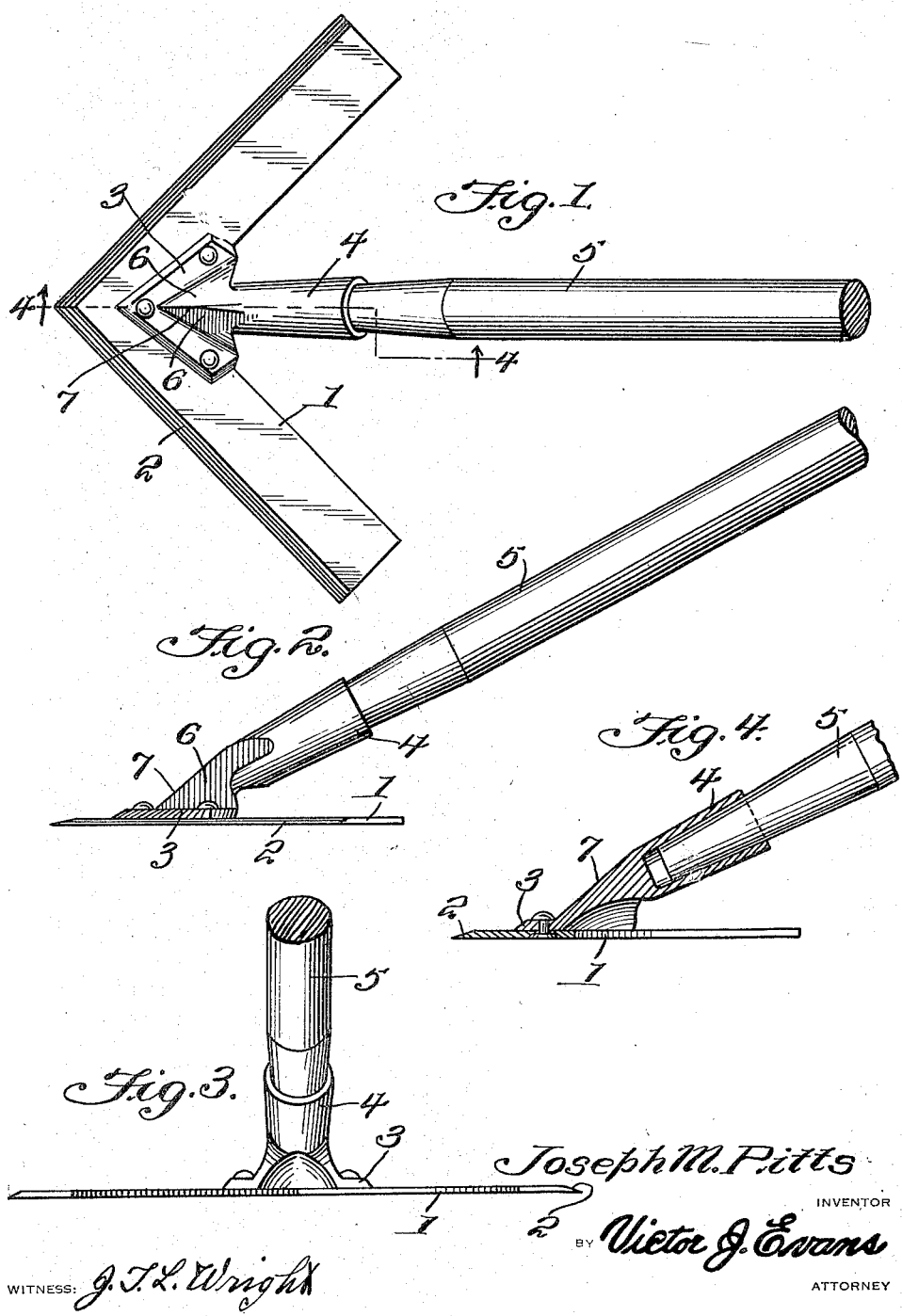

1,650,463

UNITED STATES PATENT OFFICE.

JOSEPH M. PITTS, OF MANILLA, INDIANA.

GARDEN TOOL.

Application filed August 28, 1926. Serial No. 132,184.

The object is the provision of a garden tool in the nature of a holder, and which includes an angle blade whose outer edges are sharpened, a handle receiving socket member centrally secured on or formed with the blade, said socket member having its outer edge, at the lower central portion thereof sharpened, and whereby the device may be pushed beneath the outer surface of the ground for leveling the same, cutting weeds and rendering the ground surface in a condition to conserve moisture.

To the attainment of the foregoing the invention consists in the improvement as hereinafter described and definitely claimed.

In the drawings:

Figure 1 is a top plan view of the improvement.

Figure 2 is a side elevation thereof.

Figure 3 is a rear elevation thereof.

Figure 4 is a detail sectional view on the line 4—4 of Figure 1.

As disclosed by the drawings I employ a comparatively thin flat angle blade 1. The outer edges of this blade are sharpened, as at 2. Secured centrally on the upper face of the blade 1 there is the angle base flange 3 on which is integrally formed an angularly extending socket 4 that receives a handle 5 therein. The lower portion of the socket is beveled in opposite directions from the center thereof to its connection with the base, as indicated by the numeral 6. This provides the said lower portion of the socket with a central sharpened edge 7. The implement is inserted directly below the surface of the ground to be operated on. The implement is pushed. The sharpened edges 2 of the blade will cut the soil and the sharpened edge 7 will act upon the soil contacted thereby, to further cut the same and incident to the angle sides 7 of the socket will direct the cut soil in opposite directions. The soil acted upon will be thus rendered in a level condition, which cannot be accomplished with ordinary implements for this purpose and the implement will not only cut the soil, throw the same to the sides at the center of the said implement but will sever the roots of weeds or other growths and also render the soil in a condition to conserve moisture.

The blade being of metal inherits a certain amount of resiliency, and after the blade has been passed beneath the surface of the ground should the point or apex have an inclination to tilt, such movement will be resisted by the flexing of the sides of the blade by the contact and weight of the ground surface disposed thereover.

My improved garden tool meets all of the demands of a level surface hand cultivator and weeder and with its employment no other tool is necessary in the garden through the growing season. The tool is operated from the end of the handle with the operator in an erect position which insures speed and ease of operation so that with its use more work can be accomplished than with a hoe of the ordinary construction.

Having described the invention, I claim:—

A garden tool including a flexible blade which is designed to be pushed beneath the outer surface of the ground for leveling such ground and for cutting weeds or like growths therein, said blades comprising an angle plate whose outer edges are sharpened, a socket member to which a handle is affixed and which socket member is disposed at an upward and rearward angle over the blade in a plane horizontal with respect to the apex of the blade, said socket having a lower solid portion arranged at a slight inward angle with respect to the plane of the socket and this portion extends laterally from the socket and has its sides beveled to provide a central sharpened edge, said portion merging into an angle base that is fixed to the blade adjacent to the inner edges of said blade.

In testimony whereof I affix my signature.

JOSEPH M. PITTS.